(12) United States Patent
Kinugasa et al.

(10) Patent No.: US 8,046,188 B2
(45) Date of Patent: Oct. 25, 2011

(54) TEMPERATURE SENSOR AND TEMPERATURE MEASURING METHOD

(75) Inventors: Seiichiro Kinugasa, Tokyo (JP); Atsushi Kato, Tokyo (JP)

(73) Assignee: Yamatake Corporation, Tokyo (JP)

( * ) Notice: Subject to any disclaimer, the term of this patent is extended or adjusted under 35 U.S.C. 154(b) by 414 days.

(21) Appl. No.: 12/336,921

(22) Filed: Dec. 17, 2008

(65) Prior Publication Data
US 2009/0157346 A1 Jun. 18, 2009

(30) Foreign Application Priority Data
Dec. 17, 2007 (JP) ................................ 2007-324482

(51) Int. Cl.
*G01K 17/00* (2006.01)
(52) U.S. Cl. ...................................................... 702/136
(58) Field of Classification Search .................. 702/136, 702/134
See application file for complete search history.

(56) References Cited

U.S. PATENT DOCUMENTS

| | | | |
|---|---|---|---|
| 4,776,827 A | 10/1988 | Greaves | |
| 4,816,687 A | 3/1989 | Fehrenbach et al. | |
| 2004/0076325 A1* | 4/2004 | Wada et al. | 382/154 |

FOREIGN PATENT DOCUMENTS
JP 2002-071473 A 3/2002

OTHER PUBLICATIONS

K.T.V. Grattan, et al., Fiber Optic Fluorescence Thermometry, Sensor Physics and Technology, Chapman & Hall.

* cited by examiner

*Primary Examiner* — Bryan Bui
(74) *Attorney, Agent, or Firm* — McDermott Will & Emery LLP (57) ABSTRACT

A temperature sensor for measuring temperature in accordance with a time-of-life of a fluorescent light that is produced by a fluorescent material, and is provided with a light source for imaging an excitation light, a fluorescent material for producing fluorescent light by the excitation light, a photoreceptor element for detecting the fluorescent light and outputting a fluorescent light signal in accordance with the fluorescent light intensity, and a signal processing circuit for calculating a temperature based on the fluorescent light signal from the photoreceptor element, where the signal processing circuit calculates integral values for the fluorescent light signals in the respective intervals A through C that have identical time durations, and then, based on the integral values, for two intervals, calculates a difference value, and then calculates a ratio of two difference values, to be a variable that varies in accordance with the temperature, and then references the relationship between the temperature and the ratio between difference values, stored in advance, to convert the calculated variable into the temperature.

12 Claims, 7 Drawing Sheets

TEMPERATURE SENSOR AND TEMPERATURE MEASURING METHOD

CROSS-REFERENCE TO PRIOR RELATED APPLICATIONS

The present application claims priority under 35 U.S.C. §119 to Japanese Patent Application No. 2007-324482 filed Dec. 17, 2007. The contents of that application are incorporated herein by reference in their entirety.

The present invention relates to a temperature sensor and a temperature measurement method, and, in particular, relates to a temperature sensor and a temperature measuring method for measuring a temperature in accordance with the time the time-of-life of a fluorescent light.

BACKGROUND

Fluorescent temperature sensors are that use phosphors are used broadly as temperature sensors. In a fluorescent temperature sensor, the temperature is measured using a phosphor the wherein the fluorescent characteristics vary depending on the temperature. Specifically, the phosphor is exposed to an excitation light from a light source, and the fluorescent light that is produced by the phosphor is detected. The temperature is measured through the change in the characteristics of the fluorescent light, such as the fluorescent light time-of-life.

A fluorescent material, which includes a phosphor, is disposed at an end of an optical fiber. When the excitation light is radiated from the light source, it is illuminated onto the phosphor through the optical fiber. The fluorescent light that is produced by the phosphor is detected by a photosensor through the optical fiber. The fluorescent intensity decays in accordance with, for example, $I_0 e^{-at}$, where t represents time and e represents the base of the natural logarithm (2.718 ...). The $I_0$ and a are arbitrary positive numbers.

A fluorescent temperature sensor of this type wherein the fluorescent relaxation time is calculated to measure the temperature has been disclosed previously. (See Japanese Unexamined Patent Application Publication 2002-71473, hereinafter "JP '473".) In this temperature sensor, after an LED turns OFF, the time until the reference luminous energies S1 and S2 fall to 1/e of their original energies is defined as the fluorescent relaxation time. The temperature is calculated from the relationship between the fluorescent relaxation time and the temperature T, measured in advance.

Furthermore, there has also been a disclosure of a device wherein the temperature is measured through integrating the fluorescent intensity. (See U.S. Pat. No. 4,816,687, hereinafter "U.S. '687".) In this method, the fluorescent intensity is integrated over three time intervals (T1 through T2, T2 through T3, and T3 through T4). (See FIG. 8.) When the time of integration of the middle integration interval (T2 through T3) is defined as $n_2 \Delta t$, and the times of integration in the integration intervals on both sides (T1 through T2 and T3 through T4) are defined as $n_1 \Delta t$ and $n_3 \Delta t$, then $n_2 \Delta t = n_1 \Delta t + n_3 \Delta t$. θ is defined as the value that results from subtracting the integration value of the middle interval (T2 through T3) from the sum of the integration values of the two intervals (T1 through T2 and T3 through T4). The temperature is measured using this θ.

In a photosensor, there will be noise or offsets (zero levels) included in the detected fluorescent intensity signal, when compared to the fluorescent component that is produced by the phosphor. That is, in the fluorescent intensity signal that is actually detected by the photosensor, there will inevitably be an offset (zero level) that is determined by the electronic circuitry for the measurement, by noise, etc., which changes over time. There will also be variation in the initial fluorescent intensity immediately after the light source is turned OFF. In the temperature sensor set forth in JP '473, the temperature calculation is performed with the noise and the offset still present. As a result, accurate measurements are not possible.

Furthermore, in U.S. '687, lock-in detection is used, making it difficult, in theory, to provide high-speed response. That is, in the method set forth in U.S. '687, the integration intervals cannot be set flexibly, so the detection time must be long. As a result, considerable time is required from one measurement to the next when the light source is turned ON and then OFF. In this way, the method set forth in Patent Reference 2 has a problem in that it is difficult to provide rapid response speed.

The present invention is to resolve these problem areas, and the object thereof is to provide a temperature sensor and a temperature measurement method capable of accurate measurements with rapid response speeds.

SUMMARY OF THE INVENTION

The temperature sensor in a first form of the present invention is a temperature sensor for measuring temperature in accordance with the time-of-life of a fluorescent light that is produced by a phosphor, including a light source that emits an excitation light; a phosphor that produces a fluorescent light through the excitation light; a photodetector device for detecting the fluorescent light and outputting a fluorescent light signal in accordance with the intensity of the fluorescent light; and a processing portion for calculating the temperature based on the fluorescent light signal from the photodetector device, wherein: the processing portion calculates an integral value for the fluorescent light signal in each of at least three time periods set in advance during the decay of the fluorescent light signal; calculates difference values based on the integral values in two time periods, of the three or more time periods, having identical time durations; calculates, from the two difference values, a variable that varies depending on the measurement temperature; and references a relationship between the temperature and the ratio of difference values, stored in advance, to convert the calculated variable into a temperature.

The temperature sensor in a second form of the present invention is the aforementioned temperature sensor, wherein three time periods have identical time durations; a first difference value is calculated based on the integral values of the first and second time periods, of the three time periods; a second difference value is calculated based on the integral values of the first and third time periods, of the three time periods; the variable is calculated from the ratio of the first and second difference values.

The temperature sensor in a third form of the present invention is the aforementioned temperature sensor, wherein a first difference value is calculated from the integral values for a first and a second time period having a first time duration; a second difference value is calculated from the integral values for a third and a fourth time period having a second time duration and the variable is calculated from the ratio of the first and second difference values.

The temperature sensor in a fourth form of the present invention is the aforementioned temperature sensor, wherein the setting of at least one of the three or more time periods can be changed.

The temperature sensor in a fifth form of the present invention is the aforementioned temperature sensor, wherein the setting for the time period is changed in accordance with a range of temperatures to be measured.

The temperature measuring method in a sixth form of the present invention is a temperature measuring method for measuring a temperature in accordance with a fluorescent light time-of-life of a fluorescent light that is produced by an excitation light, including a step of illuminating a phosphor with an excitation light; a step of detecting fluorescent light that is produced by the phosphor by the excitation light; a step of calculating an integral value for a fluorescent light signal in each of three or more time periods that are set in advance during the decay of the fluorescent light signal; a step for calculating a difference value based on the integral value in two time periods, of the three or more time period, shaving identical time durations; a step for calculating, from a ratio of the two difference values, a variable that varies depending on the measurement temperature; and a step for referencing the relationship between the temperature and the ratio of difference values, stored in advance, to convert the variable that has been calculated into a temperature.

The temperature measuring method in a seventh form of the present invention is the aforementioned temperature measuring method, wherein three time periods have identical time durations; a first difference value is calculated based on the integral values of the first and second time periods, of the three time periods; a second difference value is calculated based on the integral values of the first and third time periods, of the three time periods; and the variable is calculated from the ratio of the first and second difference values.

The temperature measuring method in a eighth form of the present invention is the aforementioned temperature measuring method, wherein a first difference value is calculated from the integral values for a first and a second time period having a first time duration; a second difference value is calculated from the integral values for a third and a fourth time period having a second time duration; and the variable is calculated from the ratio of the first and second difference values.

The temperature measuring method in a ninth form of the present invention is the aforementioned temperature measuring method, wherein the setting of at least one of the three or more time periods can be changed.

The temperature measuring method in a tenth form of the present invention is aforementioned temperature measuring method, wherein the setting for the time period is changed in accordance with a range of temperatures to be measured.

Given the present invention, it is possible to provide a temperature sensor and a temperature measuring method able to perform accurate measurements with rapid response speed.

DETAILED DESCRIPTION OF THE INVENTION

Figure 1:
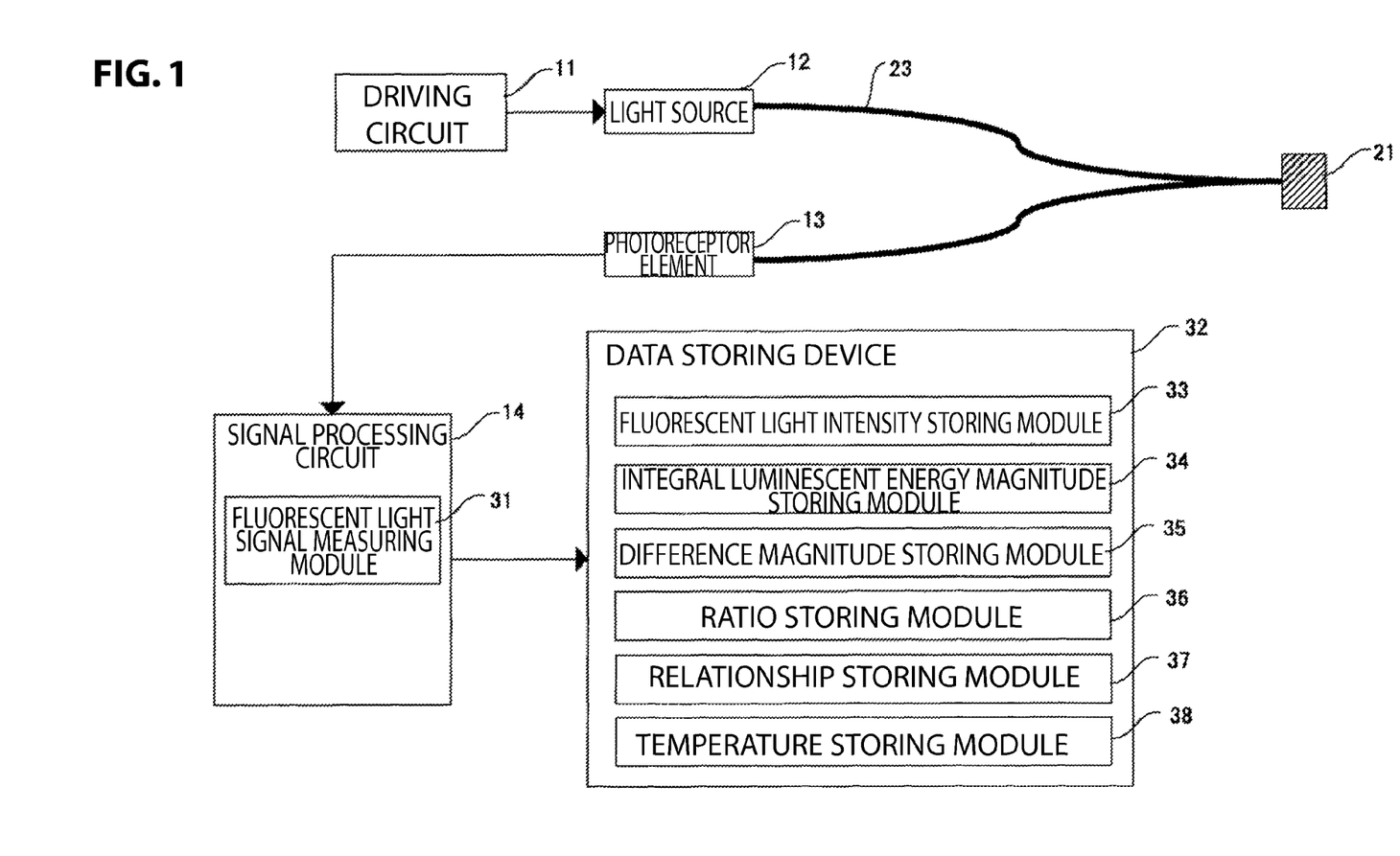
FIG. 1 is a diagram illustrating schematically the structure of a temperature sensor as set forth in the first form of embodiment according to the present invention.

A specific form of embodiment wherein the present invention is applied will be explained in detail below, referencing the figures. FIG. 1 is a diagram illustrating schematically the structure of a temperature sensor.

The temperature sensor comprises a driving circuit 11, a light source 12, a photoreceptor element 13, a signal processing circuit 14, fluorescent material 21, and a waveguide rod 23. The temperature sensor according to the form in the present embodiment is a fluorescent temperature sensor for measuring temperature using the fluorescent material 21, wherein the fluorescent properties vary depending on the temperature. Consequently, the portion wherein the fluorescent material 21 is provided is the thermal sensor portion. When the thermal sensor portion is brought into contact with a test sample to be measured, the temperature of the fluorescent material 21 will change. That is, the temperature of the fluorescent material 21 equalizes with that of the measurement test sample through thermal conduction from the measurement test sample to the fluorescent material 21, and thermal conduction in the opposite direction as well. The time-of-life of the fluorescent light will vary depending upon the temperature of the fluorescent material 21. Consequently, it is possible to measure the temperature in accordance with the time-of-life of the fluorescent light. That is, the temperature can be measured based on the decay curve of the fluorescent light.

The fluorescent material 21 and the waveguide rod 23 form the temperature sensor probe. The driving circuit 11, light source 12, photoreceptor element 13, and signal processing circuit 14 form of the main unit. The measurement is performed in a state wherein the temperature sensor probe is attached to the main unit.

A light source 12 emits an excitation light for exciting the fluorescent material 21. This excitation light is incident on the fluorescent material 21 through the waveguide rod 23. The fluorescent material 21 is excited by the excitation light, to emit a fluorescent light. This fluorescent light is guided by the waveguide rod 23 to be detected by the photoreceptor element 13.

The driving circuit 11 outputs a driver signal for driving the light source 12. The light source 12 is, for example, an LED, and emits light of a specific pulse width and pulse waveform. That is, the light source 12 emits a pulse light in accordance with a driving signal from the driving circuit 11. Here the signal that is detected by the photoreceptor element 13 is a pulse waveform that decays in accordance with $Ae^{-at}$, where t represents time and e is the base of the natural log (2.718 . . . ). A and a are arbitrary positive numbers. Note that there are no particular limitations on the waveform of the pulse light that is emitted from the light source 12.

The waveguide rod 23 has a thin rod-like shape. The waveguide rod 23 is a waveguide material such as a quartz rod or an optical fiber wherein the light can propagate. A bundle of fibers, wherein a plurality of optical fibers are bundled, may be used as well. Consequently, the waveguide rod 23 is structured from a transparent material with a high index of refraction, such as quartz or glass. The excitation light from the light source 12, and the fluorescent light that is produced by the fluorescent material 21 propagates while repetitively being fully reflected within the waveguide rod 23. That is, the waveguide rod 23 forms a projection path for illuminating the fluorescent material 21 with the excitation light. Note that in FIG. 1, a branch is illustrated in the waveguide rod 23, but it may instead be a single rod or fiber, and the excitation light and fluorescent light may be split using a half-mirror, or the like, provided in the main unit portion.

The temperature sensor probe may be provided with a protective tube for protecting the waveguide rod 23 and the fluorescent material 21. Ruby or alexandrite, or the like, may be used for the fluorescent material 21. Here ruby is used as the phosphor. Additionally, an adhesive or the like may be used to secure the fluorescent material 21, which includes the phosphor, to the end of the waveguide rod 23.

The photoreceptor element 13 is a photodetector device such as a photodiode. Consequently, the photoreceptor element 13 outputs, to the signal processing circuit 14, a signal with an intensity in accordance with the magnitude of the luminescent energy that is received. Here the signal that is outputted from the photoreceptor element 13 is the fluorescent light signal. The fluorescent light signal has a value that is in accordance with the intensity of the fluorescent light that is produced by the fluorescent material 21. The fluorescent signal not only has a fluorescent light component that is produced by the fluorescent material 21, but also has noise and a zero level (offset level).

The signal processing circuit 14 has a fluorescent light signal measuring module 31 and a data storing device 32. The signal processing circuit 14 performs calculations for measuring the temperature from the fluorescent light signal. The signal processing circuit 14 has a CPU (Central Processing Unit), a ROM (Read Only Memory), a RAM (Random Access Memory), a communications interface, and the like, and performs a variety of processes for the measurement. For example, a microcontroller, or the like, may be used as the signal processing circuit 14. The signal processing circuit 14 performs a variety of calculations in accordance with a calculation processing program that is stored in the ROM, for example. Of course, this may be a digital circuit or may be an analog circuit, or may be a combination of both. The signal processing circuit 14 need not necessarily be a physically discrete device.

For example, the fluorescent light signal measuring module 31 performs calculation processes for calculating the temperature from the fluorescent light signal. The calculation results by the fluorescent light signal measuring module 31 are then stored as appropriate in the data storing device 32. The data storing device 32 is, for example, a storage device such as a memory. That is, the fluorescent light signal measuring module 31 reads out data that is stored in the data storing device 32 and performs predetermined calculations. Then the results of the calculation processes are stored in the data storing device 32.

The data storing device 32 has a fluorescent light intensity storing module 33, and integral luminescent energy magnitude storing module 34, a difference magnitude storing module 35, a ratio storing module 36, a relationship storing module 37, and a temperature storing module 38. Note that these modules may be physically the same memory.

Figure 2:
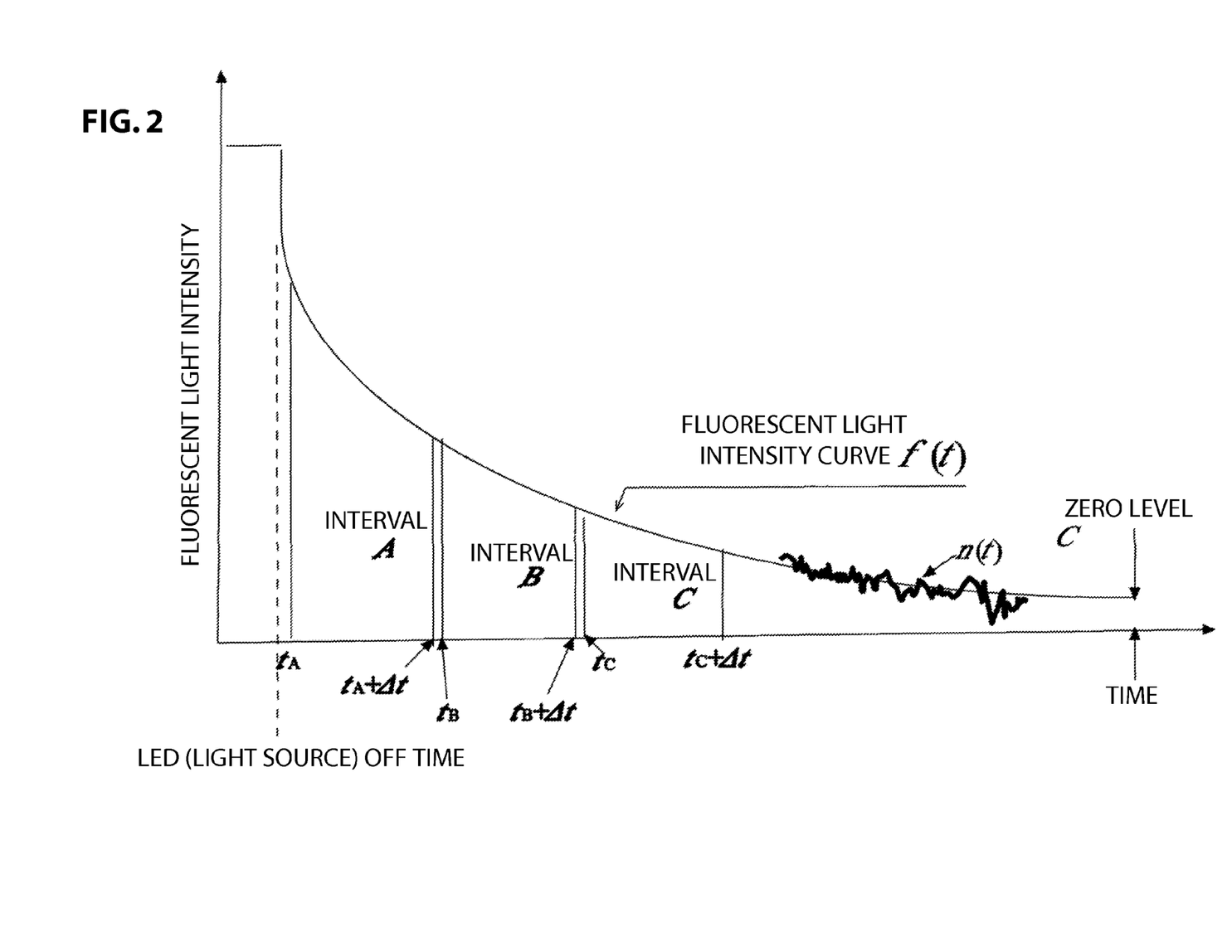
FIG. 2 is a graph illustrating a decay curve for fluorescent light.

The fluorescent light intensity storing module 33 stores the fluorescent light intensity based on the fluorescent light signal. That is, the fluorescent light intensity storing module 33 sequentially accumulates the strengths of the fluorescent light signal. The fluorescent light intensity storing module 33 accumulates the fluorescent light signal data in a time series. Consequently, a quantity of fluorescent light signal data is accumulated in the fluorescent light intensity storing module 33 in accordance with the time duration of the detection of the fluorescent light. This fluorescent light intensity is as illustrated in FIG. 2. Note that FIG. 2 is a diagram for illustrating the change over time in the fluorescent light signal that is detected by the photoreceptor element 13. The horizontal axis in FIG. 2 represents time, and the vertical axis represents the intensity of the fluorescent light signal.

As is illustrated in FIG. 2, the fluorescent light intensity decays over time from the point in time wherein the light source 12 is turned OFF. As time elapses, the fluorescent light intensity grows weaker. The speed with which the intensity of the fluorescent light decays is dependent on the temperature of the fluorescent material 21. A baseline voltage, which is an offset voltage (hereinafter termed the zero level C) is superimposed onto the fluorescent light signal. That is, even after the fluorescent light has decayed, the fluorescent light intensity will not be 0, but rather it will be constant at the zero level C. Furthermore, the fluorescent light will contain noise that acts as white noise. This noise is defined as n (t). Because this noise varies over time, it is a function of time t. The noise n (t) is produced randomly. In this way, the fluorescent light signal has an intensity wherein the noise n (t) and the zero level C are superimposed onto the fluorescent light component that is actually produced by the fluorescent material 21. Furthermore, after the light source 12 is turned OFF, then the fluorescent light signal decays exponentially. Consequently, when a sufficient amount of time has elapsed after the light source 12 has been turned OFF, then the fluorescent light intensity, for which the noise n (t) has been removed, will be essentially constant at the zero level C.

The fluorescent light signal measuring module 31 integrates the fluorescent light intensity based on the data for the fluorescent light intensity that is stored in the fluorescent light intensity storing module 33. Here integral luminous energy magnitudes (integral values) are calculated for each of three time intervals A, B, and C, established in advance. For example, the integral luminescent energy magnitude over the interval A is the sum of all of the fluorescent light intensities over the interval $t_A$ through $t_A+\Delta t$. The intervals A through C are set so as to have identical time durations $\Delta t$. Consequently, the integral luminescent energy magnitude for the interval B has an integral luminescent energy magnitude that is the sum of the fluorescent light intensities over the time interval $t_B$ through $t_B+\Delta t$. Integral values are calculated for each time interval by integrating the fluorescent light intensities over the intervals A through C.

Note that when the integral luminescent energy magnitudes for the intervals A through C are defined as $I_A$ through $I_C$, then the integral luminescent energy values $I_A$ through $I_C$ are given by the following Equation (1):

$$I_A = \int_{t_A}^{t_A+\Delta t} \{I_0 f(t) + C + n(t)\} dt \qquad \text{[Equation 1]}$$

$$= I_0[F(t_A + \Delta t) - F(t_A)] + C\Delta t + \int_{t_A}^{t_A+\Delta t} n(t) dt$$

$$I_B = \int_{t_B}^{t_B+\Delta t} \{I_0 f(t) + C + n(t)\} dt$$

$$= I_0[F(t_B + \Delta t) - F(t_B)] + C\Delta t + \int_{t_B}^{t_B+\Delta t} n(t) dt$$

-continued $$I_C = \int_{t_C}^{t_C+\Delta t} \{I_0 f(t) + C + n(t)\} dt$$

$$= I_0[F(t_C + \Delta t) - F(t_C)] + C\Delta t + \int_{t_C}^{t_C+\Delta t} n(t) dt$$

Note that $f(t)$ is a function indicating the fluorescent light intensity curve, and $I_0$ is the initial fluorescent light intensity. The initial fluorescent light intensity $I_0$ is the fluorescent light intensity at t=0, or in other words, at the point in time wherein the light source is turned OFF. Furthermore, because the decay curve for fluorescent light can be approximated as an exponential function, the fluorescent light intensity I(t) will be as per Equation (2), given below:

$$I(t) = I_0 \exp(-t/\tau) + n(t) + C \quad \text{Equation (2)}.$$

Here $\tau$ is the time-of-life of the fluorescent light, and because this is a function of the ambient temperature T, it is given as $\tau$ as if it is=$\tau(T)$.

Note that the fluorescent light signal measuring module 31 calculates the differences between the integral luminescent energy values, and stores the difference values in the difference magnitude storing module 35. Here two difference values, $I_A-I_B$ and $I_B-I_C$ are calculated as the difference magnitudes. These two difference magnitudes are stored in the difference magnitude storing module 35. As indicated in Equation (1), the integral luminescent magnitudes $I_A$ through $I_C$ are dependent on the zero level C and the noise n (t) terms. Given this, it is possible to correct for the zero level C and the noise n(t) through calculating the differences between the two integral values. That is, because each of the time durations $\Delta t$ are identical, the zero levels $C \times \Delta t$ cancel out. Additionally, the longer the time duration $\Delta t$, the more the noise n(t) over the intervals A through C converges to 0. Furthermore, because the time durations $\Delta t$ are equal, the noises n(t) will be essentially equal values over the durations A through C. Consequently, the differences in the noises n(t) will converge to 0, and the noise components will cancel out. As a result, it is possible to eliminate the effects of noise, making it possible to perform a high accuracy measurement.

The ratio g of the two difference magnitudes (the difference values) is calculated next. The ratio g can be calculated using Equation (3), below:

$$g(\tau) = (I_A - I_B)/(I_B - I_C) \quad \text{Equation (3)}$$

In this way, it is possible to calculate the ratio g in accordance with the ratio between $(I_A-I_B)$ and $(I_B-I_C)$. Note that the numerator and the denominator may instead be inverted, so that the ratio $g=(I_B-I_C)/(I_A-I_B)$. That is, the ratio g may be a value in accordance with the ratio between two difference magnitudes. The effects of variability in the initial fluorescent light intensity may be reduced through taking this ratio of difference magnitudes.

The fluorescent light signal measuring module 31 measures the temperature based on this ratio g. That is, the ratio g is a variable that varies depending on the measurement temperature. The decay curve varies in accordance with the ambient temperature T.

In this way, the decay curve function varies in accordance with the temperature, as indicated by Equation (2). Because of this, the values of the difference magnitudes ($I_B-I_C$) and $I_A-I_B$) also vary with the temperature T. The value of the ratio g can be converted into a temperature T. That is, the temperature is determined when the ratio g is determined. In this way, it is possible to convert the ratio g into a temperature T because of the one-to-one relationship between the ratio g and the measurement temperature. The fluorescent light signal measuring module 31 references the relationship between the ratio g and the temperature T, which is established in advance, to convert the ratio g into the temperature T. In this way, the fluorescent light signal measuring module 31 calculates the temperature T from the ratio g. The relationship between the ratio g and the temperature T is stored in the relationship storing module 37.

Figure 3:
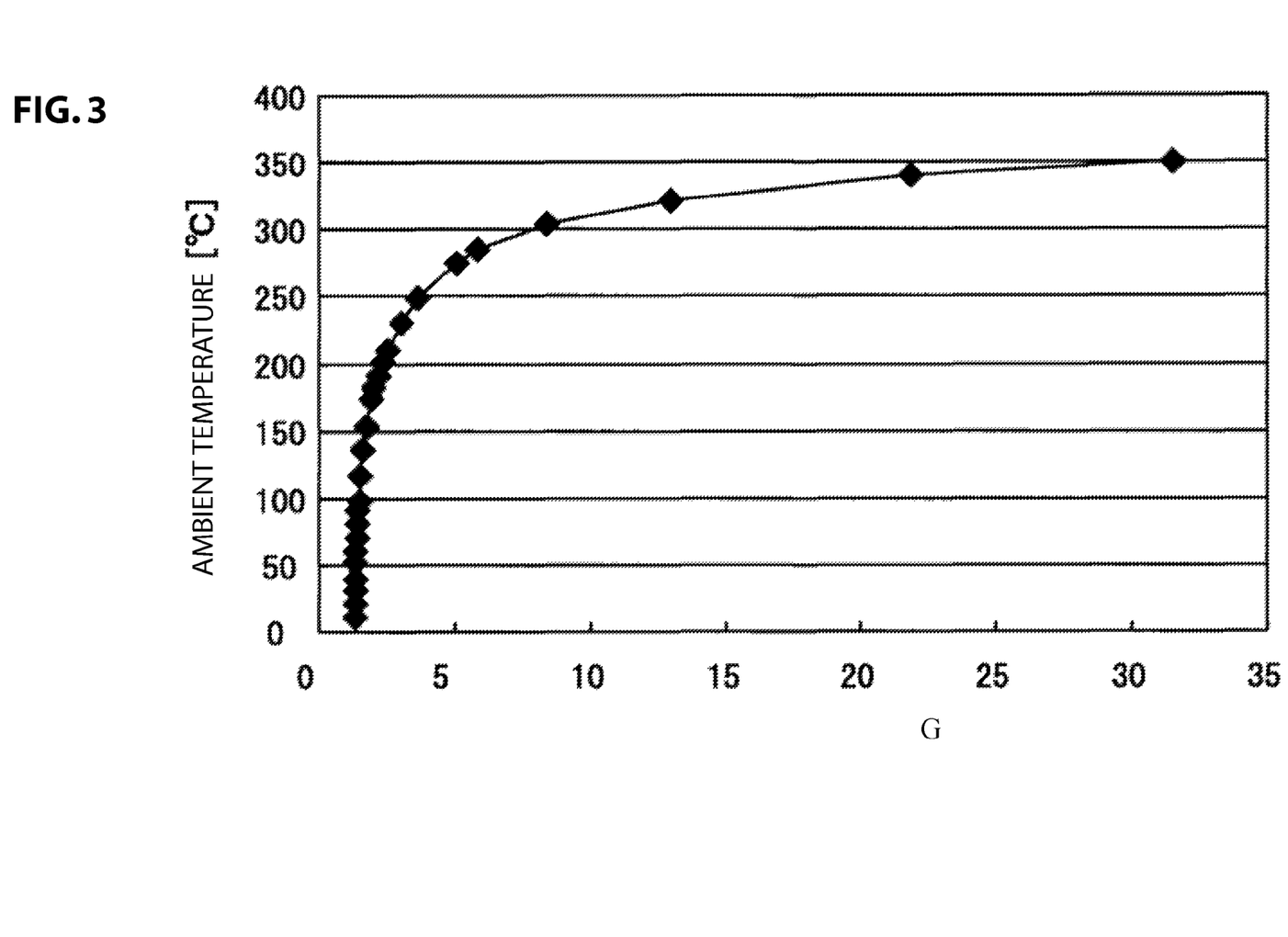
FIG. 3 is a graph illustrating the relationship between the ratio and the temperature.

For example, the relationship between the ratio g and the temperature T is as shown in FIG. 3. FIG. 3 is a graph illustrating the relationship between the ratio g and the temperature T. The horizontal axis indicates the ratio g and the vertical axis indicates the ambient temperature T. Note that FIG. 3 is a graph illustrating the results when the integrating time is 1 ms. That is, if the time at which the light source is turned OFF is defined as 0, then $I_A$ is the integral value between 0 and 1 ms, $I_B$ is the integral value between 1 and 2 ms, and $I_C$ is the integral value between 2 and 3 ms. A relational equation is calculated through, for example, measuring a number of reference temperature points for calibration. That is, measurements are performed on a measurement test sample for which the temperature is known in advance, and the ratio g is calculated. Measurements are performed a plurality of times for different temperatures, to derive a relational equation (calibration function). Here the function of the ratio g and the temperature is approximated by a polynomial to derive a relational function for the ratio g and the temperature T. Note that the approximation equation can use a polynomial of any given order. Of course, the approximation may be through an equation other than a polynomial. The temperature T is calculated through substituting the ratio g into the approximation equation. Of course, rather than an approximation equation, a conversion table indicating the relationship between the ratio g and the temperature T may be referenced to convert the ratio g into the temperature T. The fluorescent light signal measuring module 31 stores the measured temperature into the temperature storing module 38. The temperature storing module 38 sequentially accumulates the temperatures that have been measured.

It is possible to measure with improved accuracy through calculating the temperature using this type of process. That is, it is possible to eliminate the influence of the zero level C through calculating the difference magnitudes. It is also possible to eliminate the influence of the noise components as well. Furthermore, it is possible to eliminate the influence of variability in the initial fluorescent light intensity $I_0$ through calculating the ratio of the difference magnitudes. Consequently, it becomes possible to perform a accurate temperature measurement. It is possible to improve the accuracy by being able to suppress the effect of instantaneous variations through obtaining the ratio of difference values of the time integrals.

Furthermore, in the measurement set forth above it is possible to set the intervals A through C freely. Consequently, it is possible to set the intervals A through C to time bands that are prior to the complete decay of the fluorescent light intensity. In addition, it is possible to perform the measurements without using the least squares method, feedback control, or the like, making it possible to perform the calculation processing in a short period of time. This makes it possible to increase the response speed. In other words, because this eliminates the need to wait until the complete decay of the fluorescent light intensity, it becomes possible to reduce the measurement time. The result is the ability to improve the responsiveness of the temperature sensor. Furthermore, portions of the intervals A through C may be overlapped, or maybe separate.

Furthermore, it is possible to perform the measurement with higher accuracy through further changing the time periods in response to the temperature range. For example, in the graph illustrated in FIG. 3, the ratio g essentially does not change, even with a change in temperature, in the low temperature range. This is because of the characteristic of the fluorescent light time-of-life τ in the decay curve of the fluorescent light in the low temperature range, or in other words, is because of the flat decay curve. Consequently, in the low temperature range, the settings for the time may be varied. In other words, the starting times for the intervals A through C, and the time durations thereof, may be modified. Of course, either the starting time or the time duration may be modified. By doing so, it is possible to perform accurate measurements over a broad measurement range. That is, it is possible to increase the measurement range over which accurate measurements may be performed. Furthermore, because at high temperatures the intervals may be set to time bands that rapidly follow the light source 12 being turned OFF, it is possible to improve the responsiveness.

Note that the integral luminescent energy magnitude for the interval A, which is the first interval, for example, may be used in determining the measurement range. That is, it is possible to discriminate between a high temperature range and a low temperature range in accordance with the integral luminescent energy magnitude $I_A$. Furthermore, the intervals that are actually used to be determined to thereby. If the integral luminescent energy magnitude $I_A$ is within a predetermined range, then the time duration is maintained. If the integral luminescent energy magnitude $I_A$ is greater than the predetermined range, then the time duration may be extended. Doing so makes it possible to measure with high accuracy at both low temperatures and high temperatures.

In this way it is possible to modify the settings for the time intervals in accordance with the measurement range. Doing so makes it possible to perform measurements with high accuracy. When modifying the time settings, intervals D, E, F, or the like, which are different from intervals A through C, may be set in advance. Four or more time intervals may be set in advance, and is it these time intervals may be used in accordance with the measurement ranges. Of course, there is no particular constraint on the discrimination of the measurement ranges. It is possible to perform the temperature measurements with higher accuracy through being able to set the start times and the time durations of the various intervals in this way. When the intervals are used selectively in this way, the respective relational equations or conversion tables corresponding to the respective ratios g are stored in advance.

The ratio g is not limited to Equation (3). That is, all that is necessary is to be based on difference magnitudes between the two intervals having the same time durations. For example, the ratio g may be calculated using Equation (4):

$$g(\tau)=[(I_A-I_B)-(I_B-I_C)]/[(I_A-I_B)+(I_B-I_C)] \quad \text{Equation (4)}$$

In this way, the ratio g should be such that it is possible to reduce the influence of the noise n(t) and the zero level C. Consequently, the difference values are calculated based on the integral values over two time periods that have identical time durations. Moreover, the variable that varies in accordance with the measurement temperature may be calculated from the ratio of two difference values. That is, the variable may be calculated based on two difference values. Doing so makes it possible to reduce the effect of the noise n(t) and the zero level C and of variability in the initial fluorescent light intensity $I_0$.

Figure 4:
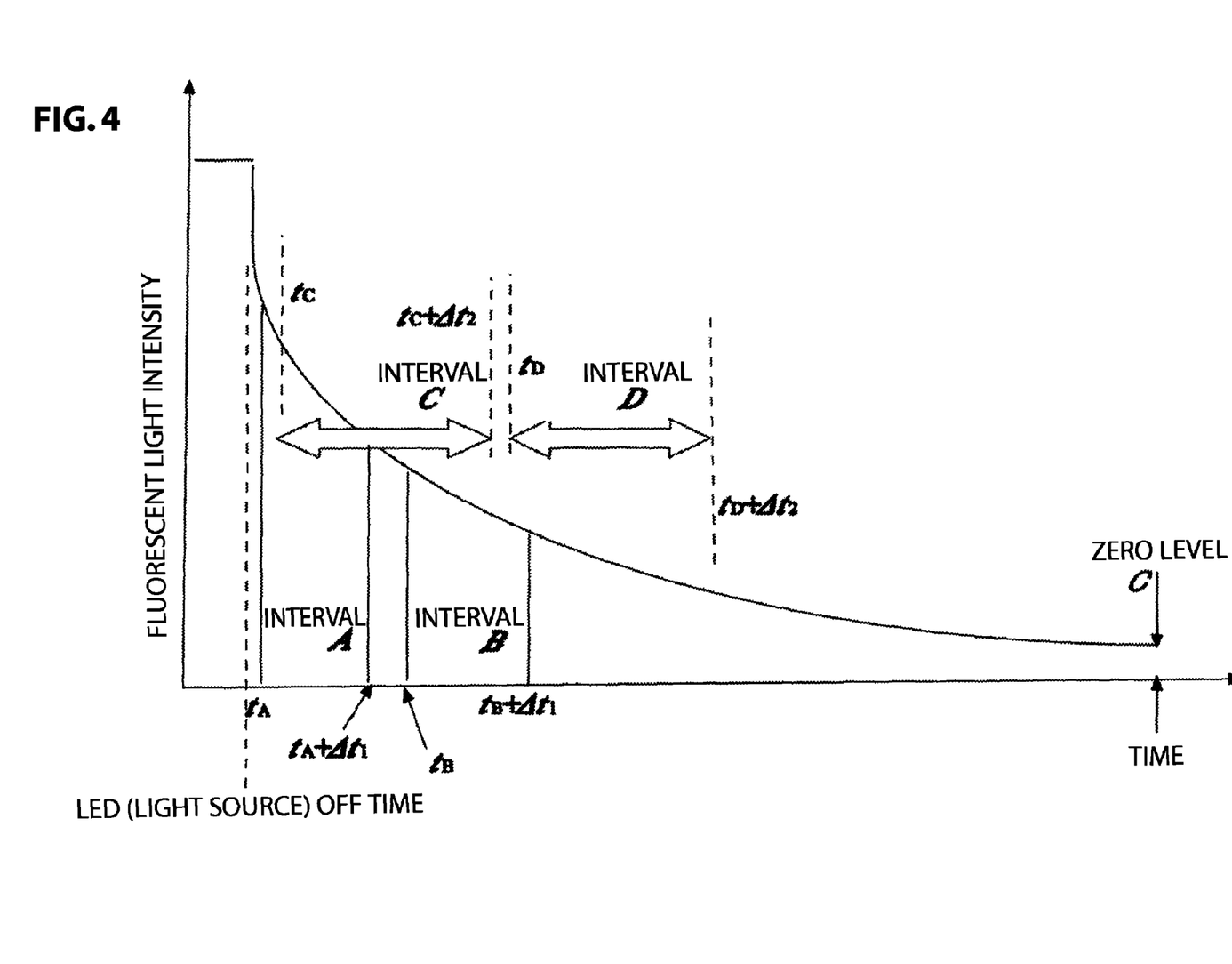
FIG. 4 is a graph illustrating a decay curve for a fluorescent light in the case wherein four intervals are provided.

While in the explanation set forth above the ratio g was calculated using three time intervals A through C, the ratio g may instead be calculated using four-time intervals. For example, time intervals A through D may be set up as illustrated in FIG. 4. Here the time durations $t_1$ of the time intervals A and B are identical. Additionally, the time durations $\Delta t_2$ of the intervals C and D are also equal. That is, two sets of two time intervals with equal time durations are set up. Here the time intervals C and D are partially overlapping with the time intervals A and D.

The integral luminescent energy magnitudes for the intervals A through D are calculated identically. That is, the fluorescent light intensities are integrated over the respective intervals A through D. Furthermore, two difference magnitudes are calculated based on the respective internal luminescent energy magnitudes $I_A$ through $I_D$. Here difference magnitudes are calculated for two time intervals having identical time durations. Consequently, it is possible to calculate the difference magnitudes $(I_A-I_B)$ and the difference magnitudes $(I_C-I_D)$.

Furthermore, the ratio g is calculated based on the difference magnitudes $(I_A-I_B)$ and the difference magnitudes $(I_C-I_D)$. Here the ratio g can be calculated using Equation (5), below:

$$g(\tau)=(I_A-I_B)/(I_C-I_D) \quad \text{Equation (5)}$$

Figure 5:
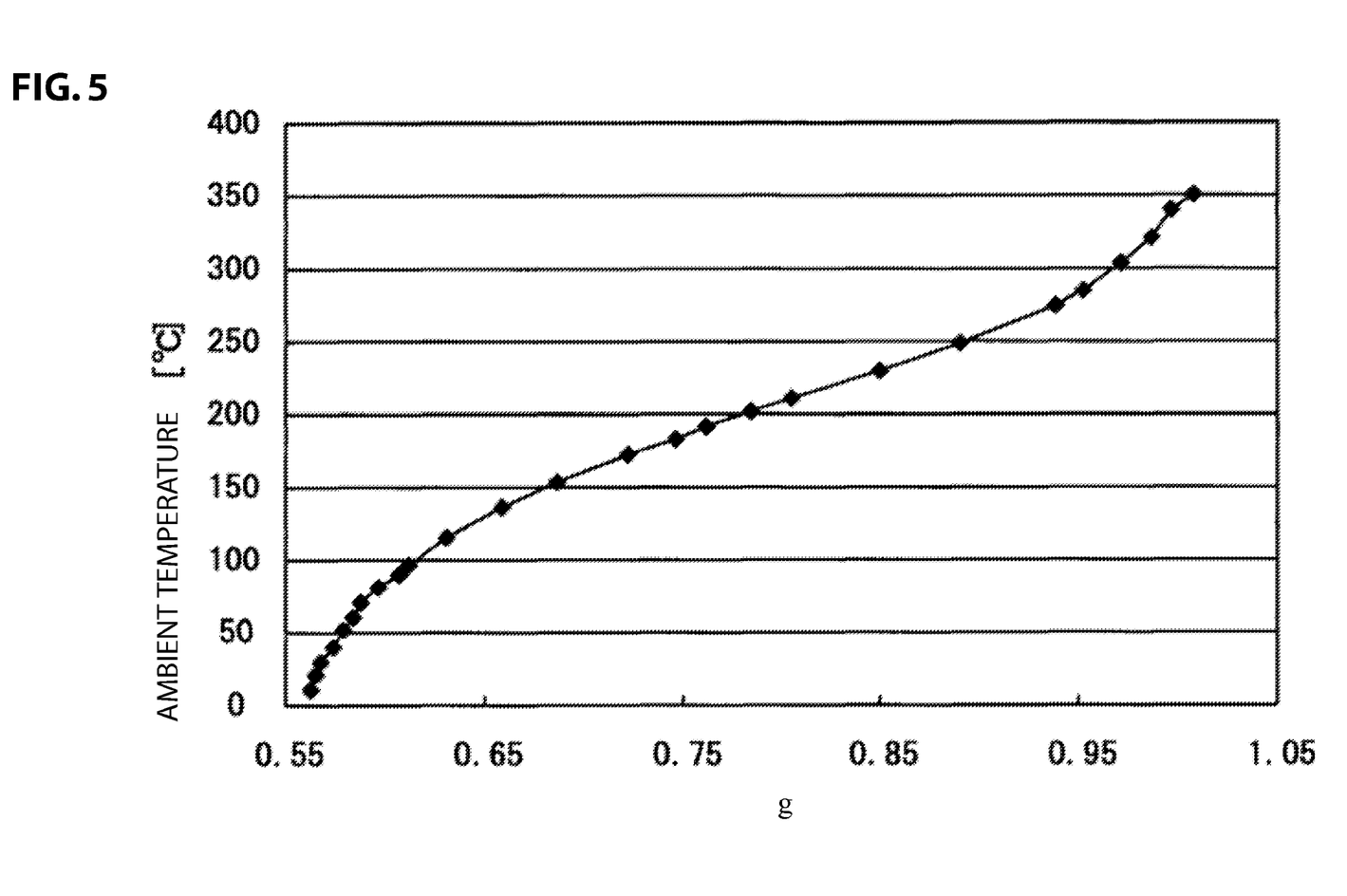
FIG. 5 is a graph illustrating the relationship between the ratio and the temperature in the case wherein four intervals are provided.

The ratio g is calculated from the difference magnitudes for the two time intervals that have identical time durations. This ratio g, as described above, is a variable related to the temperature T. Consequently, it is possible to convert the ratio g into the temperature T through referencing the relationship between the variable g and the temperature T. In this case, the relationship between the ratio $g=(I_A-I_B)/(I_C-I_D)$ and the temperature is set in advance. For example, the relationship between the ratio g and the temperature T in the case wherein the four-time intervals A through D are used may be as illustrated in FIG. 5. FIG. 5 is a graph illustrating the relationship between the ratio g and the time T, where the horizontal axis indicates the ratio g and the vertical axis indicates the ambient temperature T. If the time at which the light source is turned OFF is defined as 0, then $I_A$ is the integral value between 0 and 2 ms, $I_B$ is the integral value between 2 and 4 ms, $I_C$ is the integral value between 0 and 3 ms, and $I_D$ is the integral value between 3 and 6 ms.

It is possible to measure accurately by setting four-time intervals in this way. That is, the magnitude of change in the ratio g relative to the change in the ambient temperature T is increased in a broad measurement range. As a result, it becomes possible to measure with high accuracy over a broad temperature range from low temperatures to high temperatures. Furthermore, because a portion of the intervals A and D and the intervals C and D overlap, it is possible to measure in about the same period of time as when three time intervals are set up.

Figure 6:
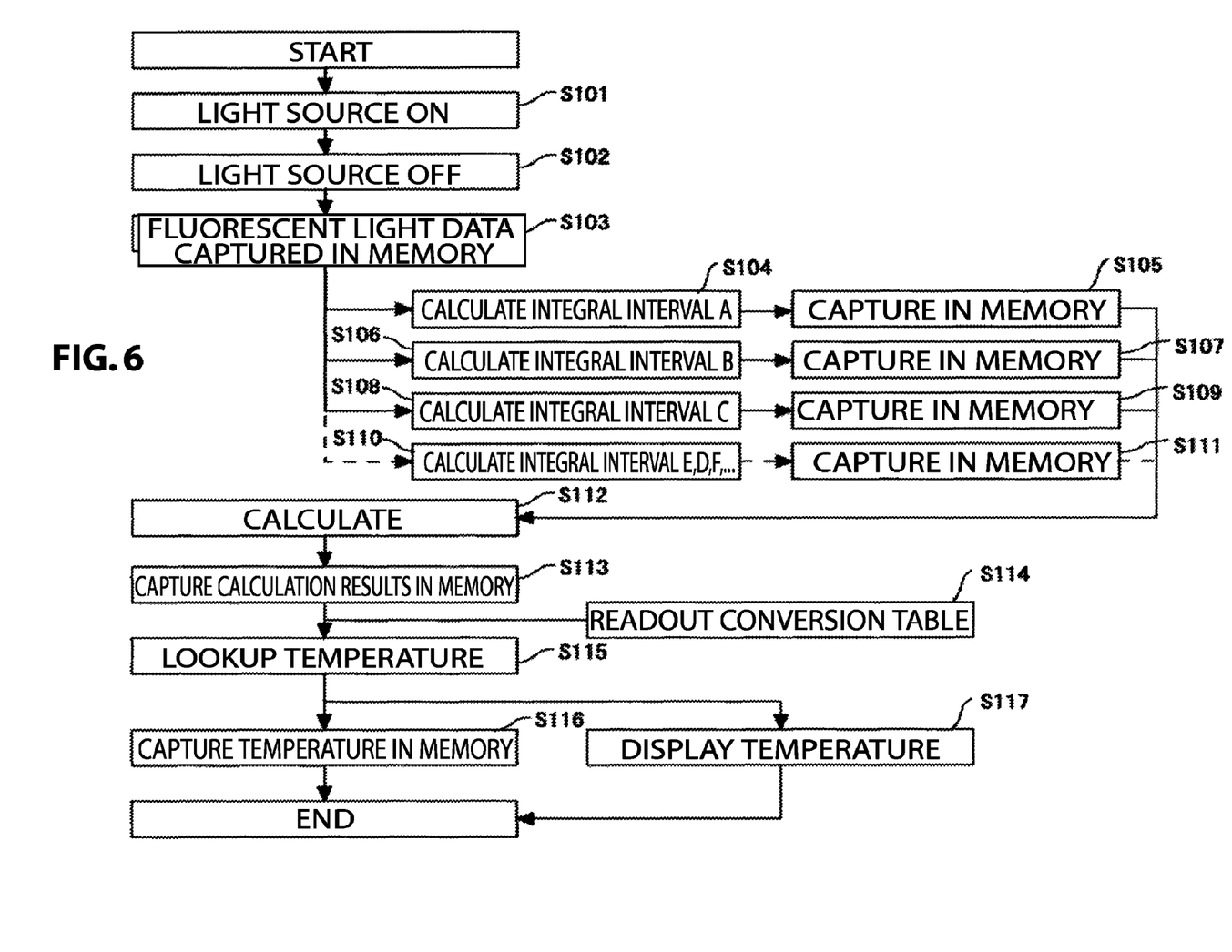
FIG. 6 is a flow chart illustrating the temperature measuring method that uses the temperature sensor as set forth in the form in the present example of embodiment.

FIG. 6 will be used next to explain the temperature measurement method that uses the temperature sensor as set forth in the form in the present example of embodiment. First, in a state wherein the thermal sensor portion of the temperature sensor probe is in contact with the measurement test sample, the light source 12 is turned OFF (Step S101). Then, after a specific time period has elapsed, the light source 12 is turned OFF (Step S102). That is, the light source 12 is turned ON over a predetermined pulse width. The fluorescent light that is produced by the excitation light is then detected by the photoreceptor element 13, and the fluorescent light intensity data is captured in the memory (Step S103). This stores the fluorescent light intensity data into the fluorescent light intensity storing module 33.

After this, the integral luminescent energy magnitude $I_A$ for the interval A is calculated (Step S104) and captured in memory (step S105). Then the integral luminescent in energy $I_B$ for the interval B is calculated (Step S106) and captured in memory (Step S107). The integral luminescent energy magnitude $I_C$ for the interval C is calculated (Step S108) and captured in memory (Step S109). If four or more intervals are set up, then the integrated luminescent energy magnitudes $I_D$, $I_E$, and $I_F$ for the intervals D, E, and F are calculated (Step S110), and are captured in memory (Step S111). Note that the start times and the time durations of the intervals are established in advance. These processes may be performed in parallel.

After this, situations are performed for the difference magnitudes and the ratios g (Step S112). Here difference magnitudes are calculated for two integral values having the same integration times. Then the ratio g is calculated in accordance with the ratio between the two difference magnitudes. Following this, the calculation results for the difference magnitudes and the ratio g are captured in memory (Step S113). The difference magnitudes are stored in the difference magnitudes storing module 35 thereby. The ratio g is stored in the ratio storing module 36. A conversion table, which is stored in advance, is read out (Step S114) to reference the temperature (Step S115). The ratio g is converted into the temperature T thereby. Of course, a relational equation (approximation equation) for calibration may be used instead of the conversion table.

The referenced temperature is captured in memory (Step S116), and displayed on a display screen (Step S117). The temperature measurement is concluded thereby. Measuring the temperature in this way can increase the measurement accuracy. It is possible to increase the response speed as well because it is possible to perform the measurement in a short period of time. The temperature sensor in the form set forth in the present example of embodiment is able to perform an accurate temperature measurement with rapid response speed.

Figure 7:
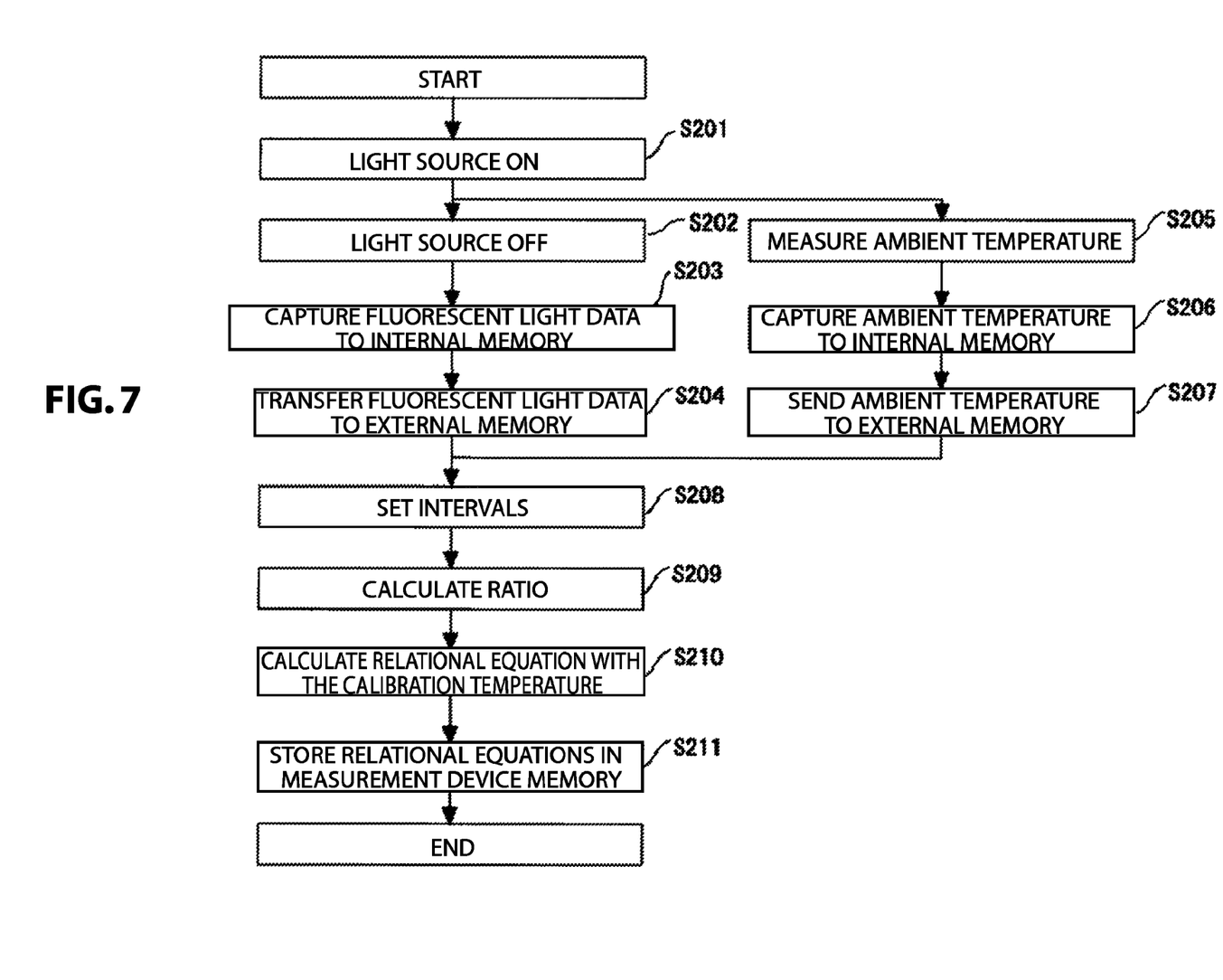
FIG. 7 is a flowchart illustrating the calibration method in the temperature sensor set forth in the form in the present example of embodiment.

FIG. 7 will be used next to describe the temperature calibration method. The calibration is performed in a state wherein, for example, the signal processing circuit 14 of the temperature sensor is connected to an external processing device. A personal computer, for example, wherein a program for calculating the relational equation may be used as this external processing device. First a sample for measuring a reference temperature is prepared, and the thermal sensor portion of the temperature sensor probe is brought into contact with the sample. Then the light source is turned ON (Step S201), and after a predetermined amount of time has elapsed, the light source is turned OFF (Step S202). The fluorescent light data after the light source is turned OFF is captured in internal memory (Step S203). That is, the data for the fluorescent light intensity is stored in the fluorescent light intensity storing module 33. Then the fluorescent light data is transferred to external memory (Step S204). That is, the signal processing circuit 14 is connected to a personal computer, which is the external processing device, and transfers the fluorescent light data to the external memory of the external processing device. A program for calculating the relational equation is stored in this personal computer.

Furthermore, the ambient temperature is measured in parallel with Step S202 through Step S204 (Step S205). Here the temperature measurement is performed using a different temperature sensor. For example, the temperature is measured using a fluorescent temperature sensor for which calibration has already been completed. Of course, the measurement may be performed using a temperature sensor other than a fluorescent temperature sensor. Then this is temperature becomes the reference temperature for performing calibration. The ambient temperature is captured to the internal memory of another temperature sensor (Step S206). The ambient temperature is transferred to the external memory (Step S207). The external memory is memory that is provided in the external processing device to which the fluorescent light data was transferred, above.

Following this, the interval is set in relation to the fluorescent light data decay curve (Step S208). Here start times, time durations, and end times, and the like, are set for three or more intervals. The interval settings may be performed by an operator, or may be set in advance. These intervals are set within the time band prior to the complete decay of the fluorescent light intensity. The ratio is calculated (Step S209). Following this, different temperatures are measured a plurality of times, to derive an equation for the relationship with the referenced temperatures (Step S210). Here a method such as the least squares method is used to approximate the relationship between the ratio g and the temperature in the form of a polynomial equation. Consequently, the coefficients of each of the terms of the polynomial equations are calculated. Doing so makes it possible to obtain a graph such as FIG. 3 or FIG. 5.

The relational equation of the measurement device memory is then obtained (Step S211). Doing so stores the relational equation into the relationship storing module 37. Of course, the settings for the intervals used when the relational equation was calculated are also stored. Doing so concludes the calibration of the temperature sensor. Four or more intervals may also be provided. In this case, the respective relational equations between the respective ratios and temperatures are calculated in accordance with the different intervals that are used. That is, relational equations are calculated in advance for each of the intervals that are used under different circumstances, to thereby perform the calibration. Of course, there is no limitation to relational equations, but rather conversion tables may be stored in the relationship storing module 37.

Note that while the explanation above was for decay wherein the intensity of the fluorescent light follows an exponential function, the present invention is not limited thereto, but can be applied to a variety of fluorescent light decay curves.

The invention claimed is:

1. A temperature sensor for measuring temperature in accordance with the time-of-life of a fluorescent light that is produced by a phosphor, comprising:
   a light source emitting an excitation light;
   a phosphor producing a fluorescent light through the excitation light;
   a photodetector device detecting the fluorescent light and outputting a fluorescent light signal in accordance with the intensity of the fluorescent light; and
   a processing portion calculating the temperature based on the fluorescent light signal from the photodetector device, wherein:
   the processing portion is configured to:
      calculates an integral value for the fluorescent light signal in each of at least three time periods set in advance during the decay of the fluorescent light signal;
      calculates a first difference value from the integral values for a first and a second time period having a first time duration;
      calculate a second difference value from the integral values for a third and a fourth time period having a second time duration;
      calculates, from a ratio of the first and second difference values, a variable that varies depending on the measurement temperature; and
      references a relationship between the temperature and the ratio of difference values, stored in advance, to convert the calculated variable into a temperature.

2. The temperature sensor as set forth in claim 1, wherein the setting of at least one of the three or more time periods can be changed.

3. The temperature sensor as set forth in claim 1, wherein the setting for the time period is changed in accordance with a range of temperatures to be measured.

4. A temperature sensor for measuring temperature in accordance with the time-of-life of a fluorescent light that is produced by a phosphor, comprising:
- a light source emitting an excitation light;
- a phosphor producing a fluorescent light through the excitation light;
- a photodetector device detecting the fluorescent light and outputting a fluorescent light signal in accordance with the intensity of the fluorescent light; and
- a processing portion calculating the temperature based on the fluorescent light signal from the photodetector device, wherein:
- the processing portion is configured to:
  - calculate an integral value for the fluorescent light signal in each of at least three time periods set in advance during the decay of the fluorescent light signal, wherein the three time periods have identical time durations;
  - calculate a first difference value based on the integral values of the first and second time periods, of the three time periods;
  - calculate a second difference value based on the integral values of the first and third time periods, of the three time periods;
  - calculate from the ratio of the first and second difference values, a variable that varies depending on the measurement temperature; and
  - reference a relationship between the temperature and the ratio of difference values, stored in advance, to convert the calculated variable into a temperature.

5. The temperature sensor as set forth in claim 4, wherein the setting of at least one of the three or more time periods can be changed.

6. The temperature sensor as set forth in claim 4, wherein the setting for the time period is changed in accordance with a range of temperatures to be measured.

7. A temperature measuring method for measuring a temperature in accordance with a fluorescent light time-of-life of a fluorescent light that is produced by an excitation light, comprising the steps of:
- illuminating a phosphor with an excitation light;
- detecting fluorescent light that is produced by the phosphor by the excitation light;
- calculating, using a processing portion, an integral value for a fluorescent light signal in each of three or more time periods that are set in advance during the decay of the fluorescent light signal;
- calculating, using the processing portion, a first difference value from the integral values for a first and a second time period having a first time duration;
- calculating, using the processing portion, a second difference value from the integral values for a third and a fourth time period having a second time duration;
- calculating, using the processing portion, from a ratio of the first and second difference values, a variable that varies depending on the measurement temperature; and
- referencing, using the processing portion, the relationship between the temperature and the ratio of the first and the second difference values, stored in advance, to convert the variable that has been calculated into a temperature.

8. The temperature measuring method as set forth in claim 7, further comprising the step of changing the setting of at least one of the three or more time periods.

9. The temperature measuring method as set forth in claim 7, further comprising the step of changing the setting for the time period in accordance with a range of temperatures to be measured.

10. A temperature measuring method for measuring a temperature in accordance with a fluorescent light time-of-life of a fluorescent light that is produced by an excitation light, comprising the steps of:
- illuminating a phosphor with an excitation light;
- detecting fluorescent light that is produced by the phosphor by the excitation light;
- calculating, using a processing portion, an integral value for a fluorescent light signal in each of three or more time periods that are set in advance during the decay of the fluorescent light signal, wherein the three time periods have identical time durations;
- calculating, using the processing portion, a first difference value based on the integral values of the first and second time periods, of the three time periods;
- calculating, using the processing portion, a second difference value based on the integral values of the first and third time periods, of the three time periods;
- calculating, using the processing portion, the variable from the ratio of the first and second difference values; and
- referencing, using the processing portion, the relationship between the temperature and the ratio of the first and second difference values, stored in advance, to convert the variable that has been calculated into a temperature.

11. The temperature measuring method as set forth in claim 10, further comprising the step of changing the setting of at least one of the three or more time periods.

12. The temperature measuring method as set forth in claim 10, further comprising the step of changing the setting for the time period in accordance with a range of temperatures to be measured.

* * * * *